US007646896B2

(12) United States Patent
Yukhin et al.

(10) Patent No.: US 7,646,896 B2
(45) Date of Patent: Jan. 12, 2010

(54) APPARATUS AND METHOD FOR PERFORMING ENROLLMENT OF USER BIOMETRIC INFORMATION

(75) Inventors: Artiom Yukhin, Moscow (RU); Andrey Klimov, Moscow (RU); Sergey Suhovey, Moscow (RU); Gleb Gusev, Moscow (RU); Alexey Gostomelsky, Moscow (RU)

(73) Assignee: A4Vision, Sunnyvale, CA (US)

( * ) Notice: Subject to any disclaimer, the term of this patent is extended or adjusted under 35 U.S.C. 154(b) by 261 days.

(21) Appl. No.: 11/485,745

(22) Filed: Jul. 12, 2006
(Under 37 CFR 1.47)

(65) Prior Publication Data
US 2007/0165244 A1    Jul. 19, 2007

Related U.S. Application Data

(60) Provisional application No. 60/713,239, filed on Aug. 31, 2005, provisional application No. 60/709,677, filed on Aug. 18, 2005, provisional application No. 60/708,802, filed on Aug. 15, 2005, provisional application No. 60/705,246, filed on Aug. 2, 2005.

(51) Int. Cl.
*G01B 11/24*    (2006.01)
(52) U.S. Cl. .................................. 382/115; 356/603
(58) Field of Classification Search ................ 382/115; 356/603
See application file for complete search history.

(56) References Cited

U.S. PATENT DOCUMENTS 4,349,277 A    9/1982  Mundy et al.
5,461,417 A *  10/1995 White et al. ................. 348/131
(Continued)

FOREIGN PATENT DOCUMENTS

EP    0076866 B1    4/1983
(Continued)

OTHER PUBLICATIONS

Valente, Stephane, et al., "A visual analysis/synthesis feedback loop for accurate face tracking", Signal Processing: Image Communication, Elsevier Science Publishers, Amsterdam, NL., vol. 16, No. 6, Feb. 1, 2001, pp. 585-608.
(Continued)

*Primary Examiner*—Charles Kim
*Assistant Examiner*—Stephen R Koziol
(74) *Attorney, Agent, or Firm*—Fenwick & West LLP

(57) ABSTRACT

A device for user enrollment is adapted to capture an image of a pattern projected on a target and distorted on the three-dimensional (3D) surface of the target, such as a human face, and an image of a two-dimensional (2D) surface of the target. The device can include an illumination unit adapted to project a patterned light onto the surface of the target in an invisible light wavelength, a 3D image capturing device to capture an image of a pattern projected on the target and distorted on the 3D surface of the target. The device can also include a 2D image capturing device adapted to capture an image of a 2D frontal view of the target in visible light. The device can also include an orientation unit that displays the face of the target in order to facilitate the positioning of the target within the proper fields of view.

20 Claims, 12 Drawing Sheets

U.S. PATENT DOCUMENTS

| | | | |
|---|---|---|---|
| 5,615,003 | A | 3/1997 | Hermary et al. |
| 5,640,962 | A | 6/1997 | Jean et al. |
| 5,717,512 | A * | 2/1998 | Chmielewski et al. ... 359/210.1 |
| 6,377,700 | B1 | 4/2002 | Mack et al. |
| 6,927,854 | B2 | 8/2005 | Hirabayashi et al. |
| 2002/0006222 | A1 | 1/2002 | Inagaki et al. |
| 2003/0123713 | A1 | 7/2003 | Geng |
| 2004/0218788 | A1 | 11/2004 | Geng |
| 2005/0111705 | A1 | 5/2005 | Waupotitsch et al. |
| 2005/0225662 | A1 | 10/2005 | Tsuda et al. |

FOREIGN PATENT DOCUMENTS

| | | |
|---|---|---|
| WO | WO 00/70303 A1 | 11/2000 |
| WO | WO 2006/031147 A1 | 3/2006 |

OTHER PUBLICATIONS

Tajima, J., et al., "3-D data acquisition by Rainbow Range Finder," Pattern Recognition, 1990. Proceedings, 10th International Conference on Pattern Recognition, Jun. 16-21, 1990, pp. 309-313, vol. 1, No. 10.

Wust, C., et al., "Surface profile measurement using color fringe projection," Machine Vision and Applications, Jun. 1991, pp. 193-203, vol. 4, No. 3.

Kotov, A., International Search Report, International Application No. PCT/RU2005/000210, Aug. 25, 2005, 1 page.

* cited by examiner

APPARATUS AND METHOD FOR PERFORMING ENROLLMENT OF USER BIOMETRIC INFORMATION

RELATED APPLICATIONS

This application is related to U.S. patent application Ser. No. 11/254,220 filed on Oct. 18, 2005; and claims priority to U.S. provisional application 60/705,246 filed on Aug. 2, 2005; U.S. provisional application 60/708,802 filed on Aug. 15, 2005; U.S. provisional application 60/709,677 filed on Aug. 18, 2005; and U.S. provisional application 60/713,239 filed on Aug. 31, 2005 which are all incorporated by reference herein in their entirety.

FIELD OF INVENTION

The present invention relates generally to three-dimensional (3D) face enrollment systems and methods.

BACKGROUND OF THE INVENTION

Biometric identification systems that do not require a target's cooperation are enjoying great popularity and demand among governmental authorities and companies where security is of importance, such as airports, banks, workplaces and other secure or restricted places. For instance, systems employing biometric facial recognition, unlike security systems that require target cooperation (e.g., fingerprint recognition, iris recognition, etc.), require no human cooperation, awareness, or contact. These systems can work passively at a distance in a real time environment.

Conventional systems and methods for biometric facial recognition typically use 2D images of a person's face, similar to images received from video or photo cameras. Although 2D image data is easy to collect, it is not uniquely distinctive and the quality of the acquired data is dependent on a variety of conditions, such as ambient light conditions, view angle, etc. Consequently, the reliability of 2D biometric facial recognition systems lags behind many conventional security systems that use biometric data, such as fingerprints, retinal eye patterns, or hand geometry, to identify a person. Some conventional systems, such as those only capable of capturing 2D image data, experience difficulty in isolating a target image, such as a person's face, from other targets. These systems also experience accuracy problems because the quality of the acquired data is negatively affected by shadows or movement by the person to be identified.

3D images, in contrast, are not negatively affected by any movement or position of the target to be identified and do not depend on the texture and color of the skin. Since 3D images carry more information about the target than 2D images, it is desirable to use 3D images in biometric identification systems. In addition, it is desirable to have a system that simultaneously captures an image of a 3D surface of a target for automated recognition, for example, and a 2D photographic image of the target that can be used for passport, driver licenses, and other identification documents which can be used as a back-up or confirmatory identification system.

SUMMARY OF THE INVENTION

A device for user enrollment is adapted to capture an image of a pattern projected on a target, the distortion to this pattern enables the production of the three-dimensional (3D) surface of the target, such as a human face while also being capable of capturing an image of a two-dimensional (2D) surface of the target. The device can include an illumination unit adapted to project a pattern onto the surface of the target in a light wavelength not visible by the human eye, a 3D image capturing device adapted to capture an image of the pattern projected on the target. The device can also include a 2D image capturing device adapted to capture an image of a 2D frontal view of the target in the human eye visible wavelength of light. The device can also include an orientation unit that displays the face of the target in order to facilitate the positioning of the target within the proper fields of view.

In another embodiment, the 2D image capturing device is part of the 3D image capturing device so that the 3D image capturing device is adapted to capture an image of a 2D view of the target.

The device for user enrollment can be also in compliance with the standards imposed by the International Civil Aviation Organization (ICAO), as well as other standards for creating photographic images.

In another embodiment, the device can be a stationary device mounted on a wall adapted to control physical access of targets to a secured area. Yet, in another embodiment, the device can perform both user enrollment and can control physical access to a secured area.

The features and advantages described in the specification are not all inclusive and, in particular, many additional features and advantages will be apparent to one of ordinary skill in the art in view of the drawings, specification, and claims. Moreover, the language used in the specification has been principally selected for readability and instructional purposes, and may not have been selected to delineate or circumscribe the inventive subject matter.

DETAILED DESCRIPTION OF THE EMBODIMENTS

Figure 1A:
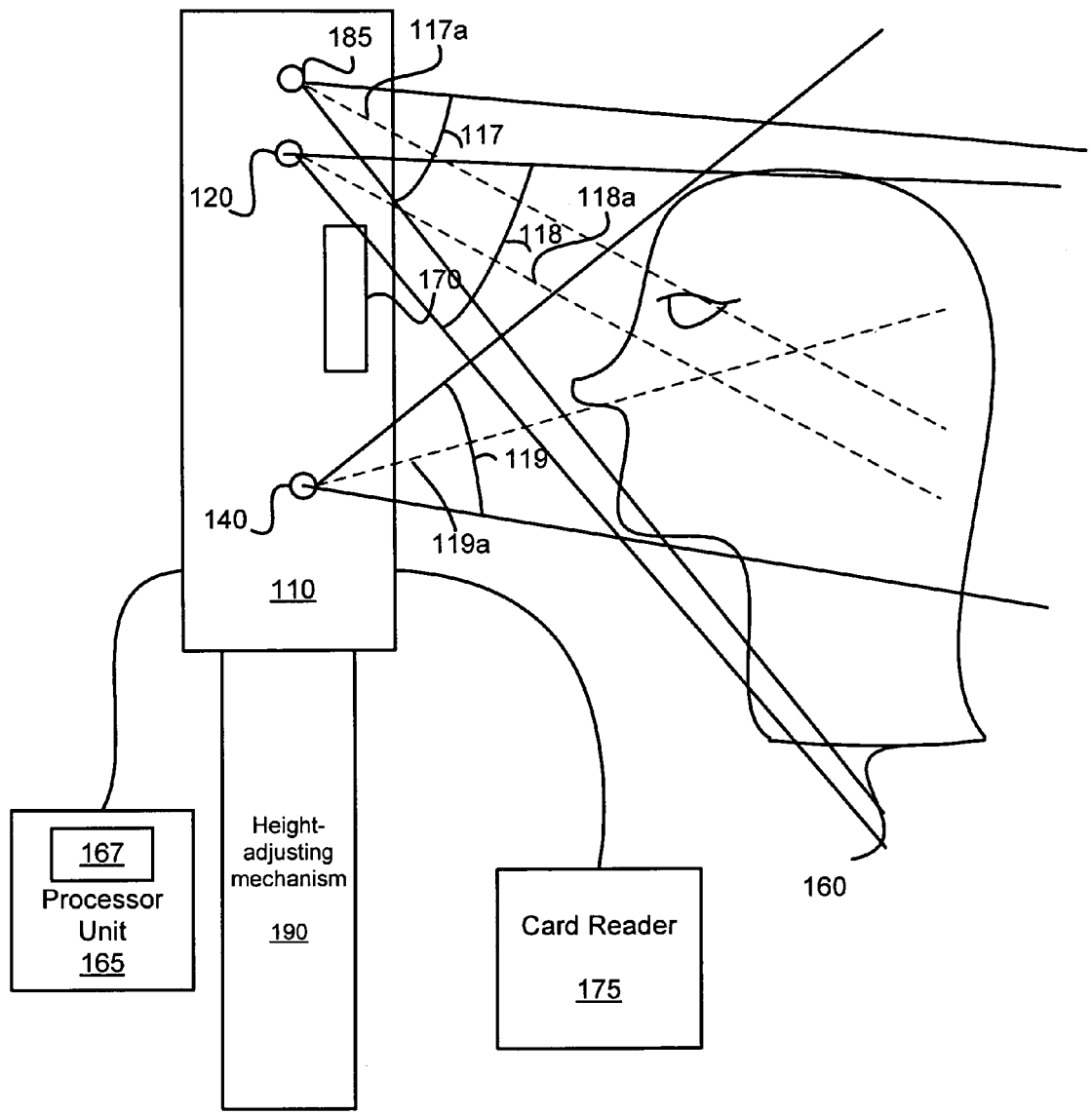
FIG. 1A is a side view of a device that performs user enrollment according to one embodiment of the present invention.

A preferred embodiment of the present invention is now described with reference to the figures where like reference numbers indicate identical or functionally similar elements. Also in the figures, the left most digit(s) of each reference number corresponds to the figure in which the reference number is first used.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing some of the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

FIG. 1A is a side view of an enrollment device 110 adapted to perform biometric control and biometric enrollment of a face of a human being. The target 160 positions himself in front of an orientation unit 170 so that the target 160 is in the fields of view 117, 118, and 119 of a 2D image capturing device 185, an illumination unit 120, and a 3D image capturing device 140, respectively. The centerlines of the three fields of view are shown as lines 117a, 118a, 119a in FIG. 1A. Illumination unit 120 projects a patterned light a on target 160 in a non-visible frequency or frequency range, as described below. A 3D image capturing device 140 is adapted to capture the distorted image of a pattern projected on the target 160.

The 2D image capturing device 185 captures an image of a 2D view of the target 160 in visible light. 2D photographic images can be used in identification documents, such as driver licenses, as well as in 3D biometric control as a human backup or secondary identification system. The enrollment device 110 can be coupled to a height adjusting mechanism 190 to provide additional flexibility when positioning the enrollment device 110.

Enrollment device 110 is connected to the processor unit 165. The processor unit 165 is adapted to receive a distorted image of a 3D surface of the target from enrollment device 110 and to process the distorted image to reconstruct a 3D image of the target. One example of such a process is used by the Vision 3D Enrollment Station that is commercially available from A4 Vision, Sunnyvale, Calif.

The processor unit 165 can be a general-purpose computer, a personal digital assistant (PDA), or any other computer system having a processor. Enrollment device 110 can be connected to the processor unit 165 via various interfaces, e.g., wireless, wireline, or any other connection. The processor unit 165 also stores data in a storage device 167 for storing user biometrics.

In one embodiment, enrollment device 110 can be connected to a card reader device 175. Device 175 is adapted to read the contents of a card that includes target's 160 identification information for the target 160 and to transmit this information to the processor unit 165. The processor unit 165 uses the received information to perform identification and recognition of the target 160. The enrollment Device 110 is connected to the card reader device 175 via various interfaces (e.g., wired (wireline), wireless, magnetic (e.g., WIEGAND) or any other connection).

In one embodiment, enrollment device 110 is adapted to perform enrollment of the target 160, e.g., the face of the target, to create a database of biometrics. In this embodiment, enrollment device 110 can be a movable device. In another embodiment, enrollment device 110 can be a stationary device mounted to a wall and adapted to control physical access to a secured area. Yet, in another embodiment, enrollment device 110 can perform both user enrollment and can control physical access to a secured area. This embodiment will be described in more detail below with reference to FIG. 6.

Figure 1B:
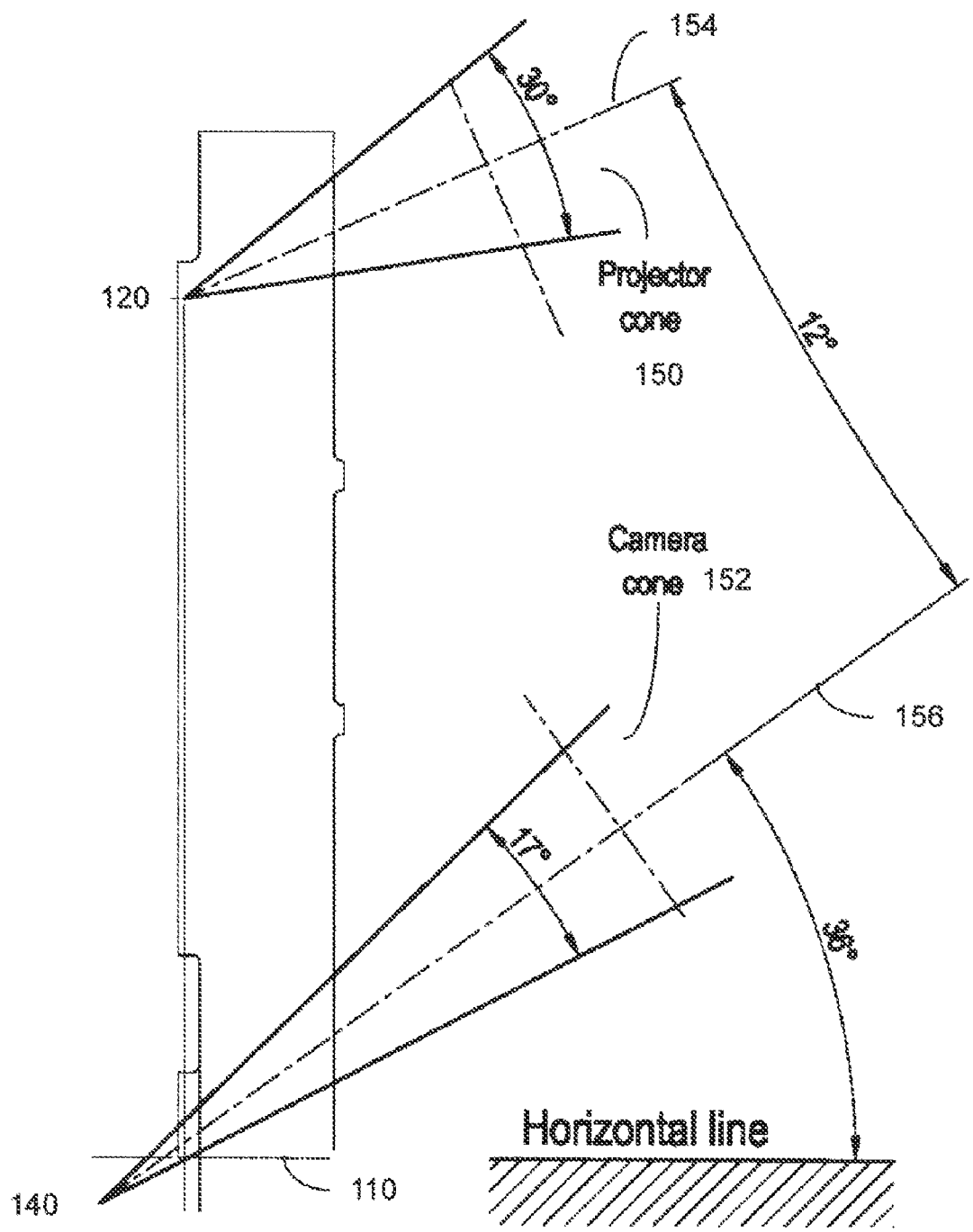
FIG. 1B is a side view showing the angles of operation of a user enrollment device according to one embodiment of the present invention.

FIG. 1B is a side view showing the angles of operation of a user enrollment device according to one embodiment of the present invention. The enrollment device 110 is positioned and, in one embodiment, the illumination unit 120 projects an illumination pattern. In one embodiment, the resulting projection cone 150 expands at an angle of approximately 30 degrees. The 3D image capturing device 140 captures images positioned within the 3D camera cone 152. In one embodiment the 3D camera cone 152 expands at an angle of approximately 17 degrees. In the embodiment illustrated in FIG. 1B the centerline of the 3D camera cone 156 is approximately 36 degrees off horizontal and the centerline of the projector cone 154 and the centerline of the 3D camera cone 156 approach each other at an angle of approximately 12 degrees. This enables people of different heights to accurately position themselves in the face position plane which is the overlap of the projector code 150, 3D camera code 152 and optionally a 2D camera cone (not shown). The 2D camera code is a cone within which the 2D image capturing device 185 captures images.

The enrollment device 110 and the orientation unit 170 can be position at an angle relative to the horizontal plane. In one embodiment, the enrollment device is positioned at approximately 36 degrees above the horizontal plane. For example, in one embodiment the distance between the illumination unit 120 and the 3D image capturing device 140 is approximately 190 millimeters. In the example illustrated in FIG. 2, with the 3D image capturing device positioned approximately 850 mm above the ground, an image of a person's face can be captured from approximately 600 mm to over 1200 mm from the orientation unit 170. It would be apparent based upon the above disclosure that alternate angles can be used to account for different positions of the enrollment device 110.

Figure 2:
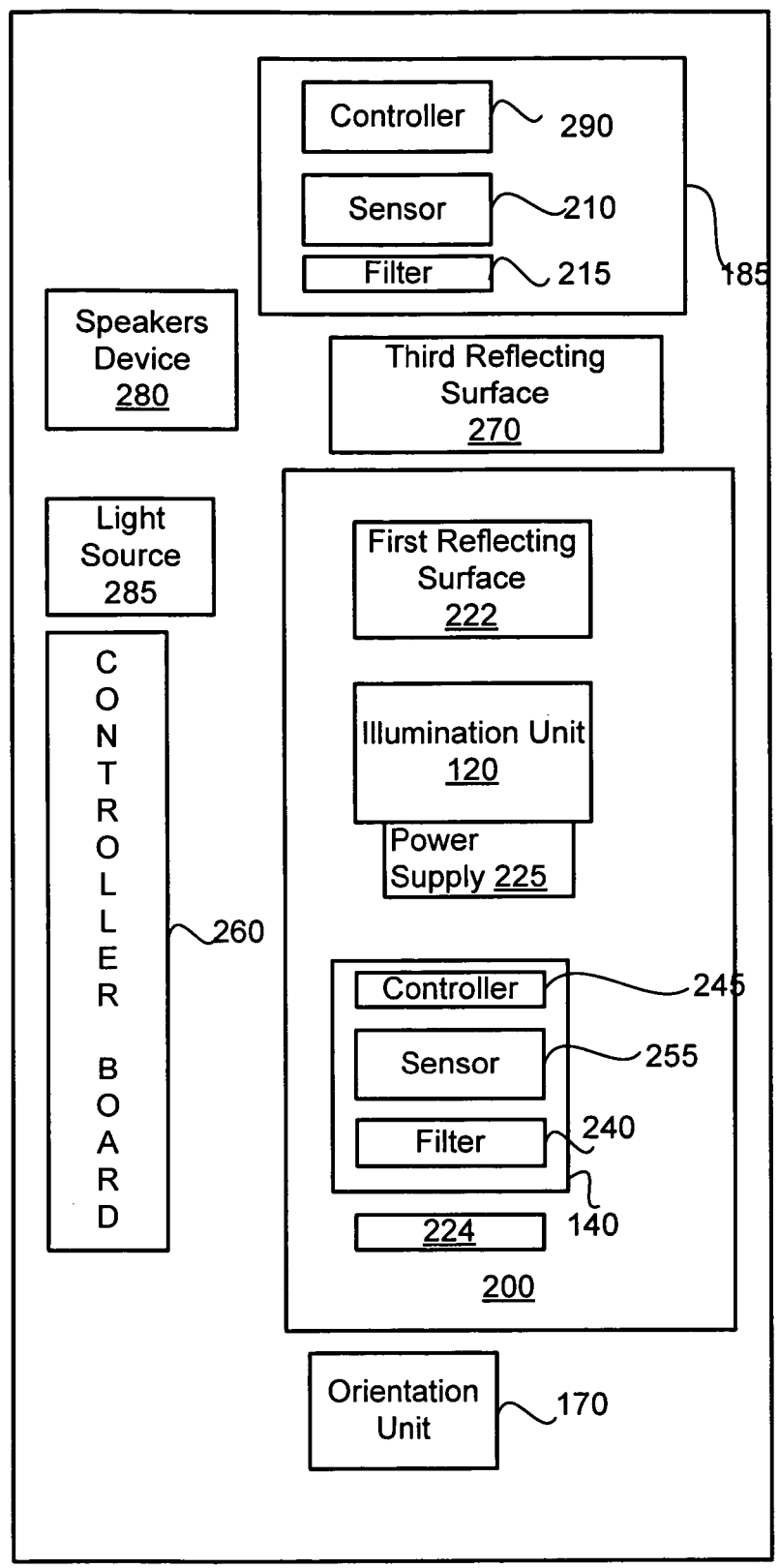
FIG. 2 is a block diagram of the components of the enrollment unit according to one embodiment of the present invention.

FIG. 2 is a block diagram of the components of the enrollment unit in accordance with one embodiment of the present invention. Enrollment device 110 includes an optical unit 200, a 2D image capturing device 185, an orientation unit 170, a speaker unit 280, a light source 285, and a controller board 260. The optical unit 200 comprises the illumination unit 120 coupled to a power supply unit 225, a first reflecting surface 222, and a second reflecting surface 224 and a 3D image capturing device 140 which in one embodiment includes a filter 240, sensor 255 and controller 245. These components are described in greater detail below.

Figures 11A, 11B:
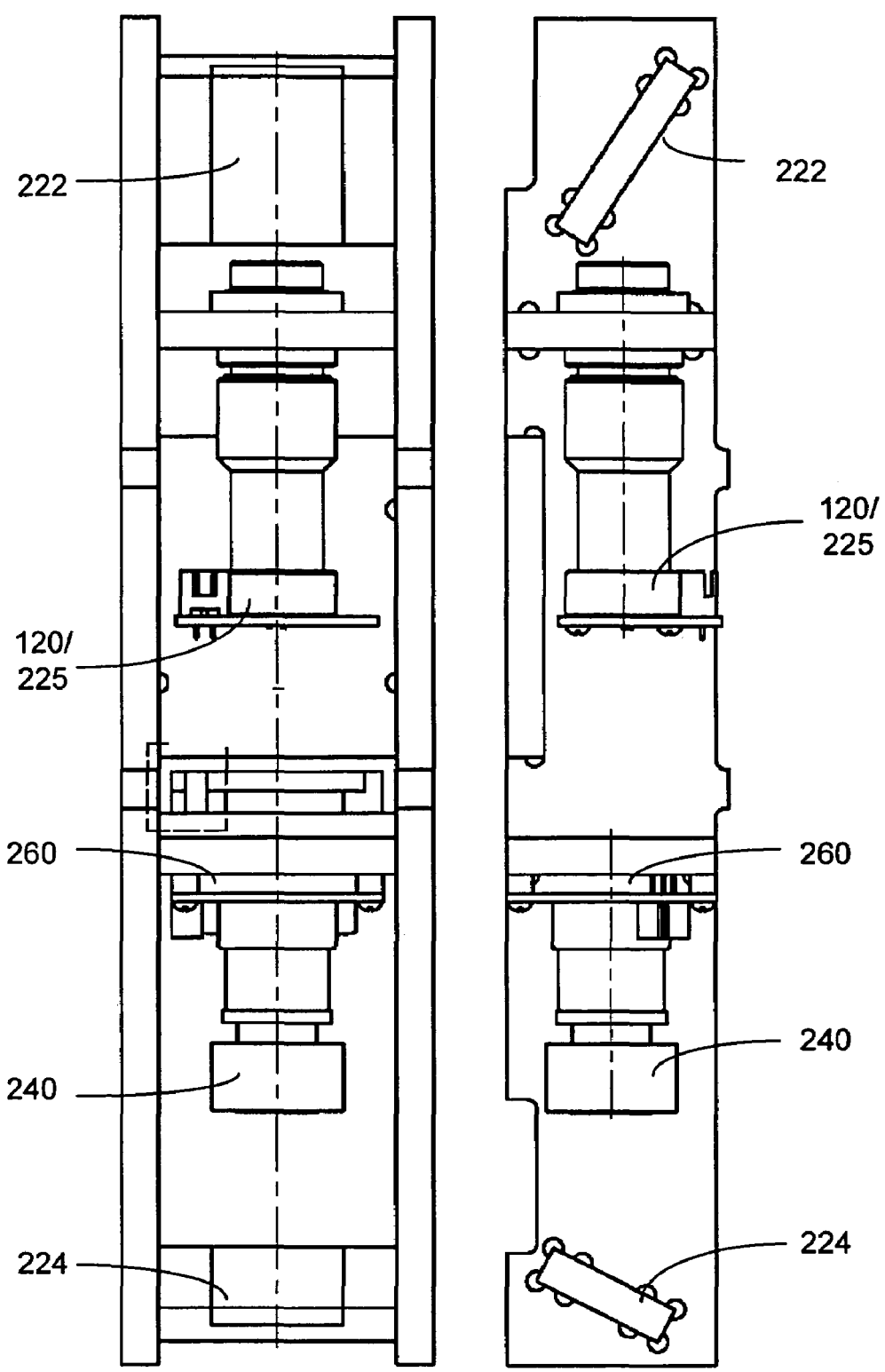
FIGS. 11A and 11B are illustrations of an optical unit according to one embodiment of the present invention.

FIGS. 11A and 11B are cross-sectional illustrations from orthogonal perspectives of an optical unit 200 in accordance with one embodiment of the present invention. With reference to FIG. 11, the illumination unit 120 is positioned adjacent to and receives power from the power supply 225. The illumination unit 120 is adapted to project light on the target 160 as shown in FIG. 1A. The illumination unit 120 can be any suitable light-emitting device, such as, for example, a laser, a projector, or any other device that generates a light signal at a particular frequency or range of frequencies, e.g., infrared. In one embodiment of the present invention, illumination unit 120 is adapted to project a patterned light, e.g., stripes, a grid, or any other pattern. In another embodiment, illumination unit 120 is adapted to project light onto target 160 evenly. Additional details of the patterned light are set forth below.

With reference to FIGS. 2 and 11, a first reflecting surface 222 for reflecting light is positioned above the illumination unit 120 at an angle, e.g., the angles described above. The patterned light from the illumination surface is directed toward the first reflecting surface 222 which reflects the light and creates the projector cone 150. The patterned light is shone upon a face of a target. A 3D capturing device 140 takes a picture of the face with the patterned light when the face is positioned within the camera cone 152. The image is reflected off a second reflecting surface 224 that is positioned underneath the 3D image capturing device 140. The first reflecting surface 222 and the second reflecting surface 224 are adapted to refract optical axes of illumination unit 120 and 3D image capturing device 140 as is known in the art. This technique is used to provide dimension reduction of optical unit 200.

Figure 3:
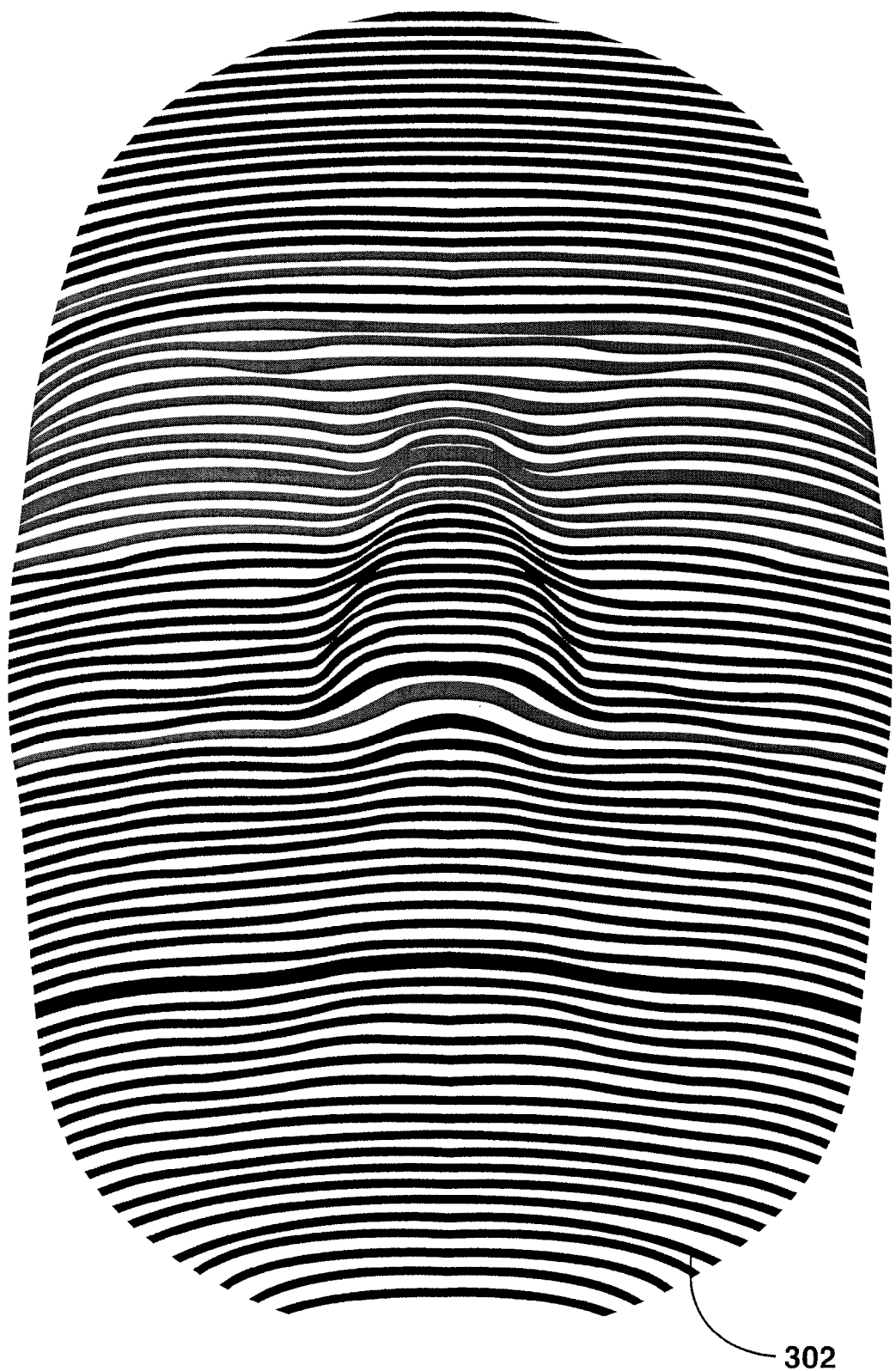
FIG. 3 is an exemplary distorted image of a face having patterned light projected thereon according to one embodiment of the present invention.
Figure 10:
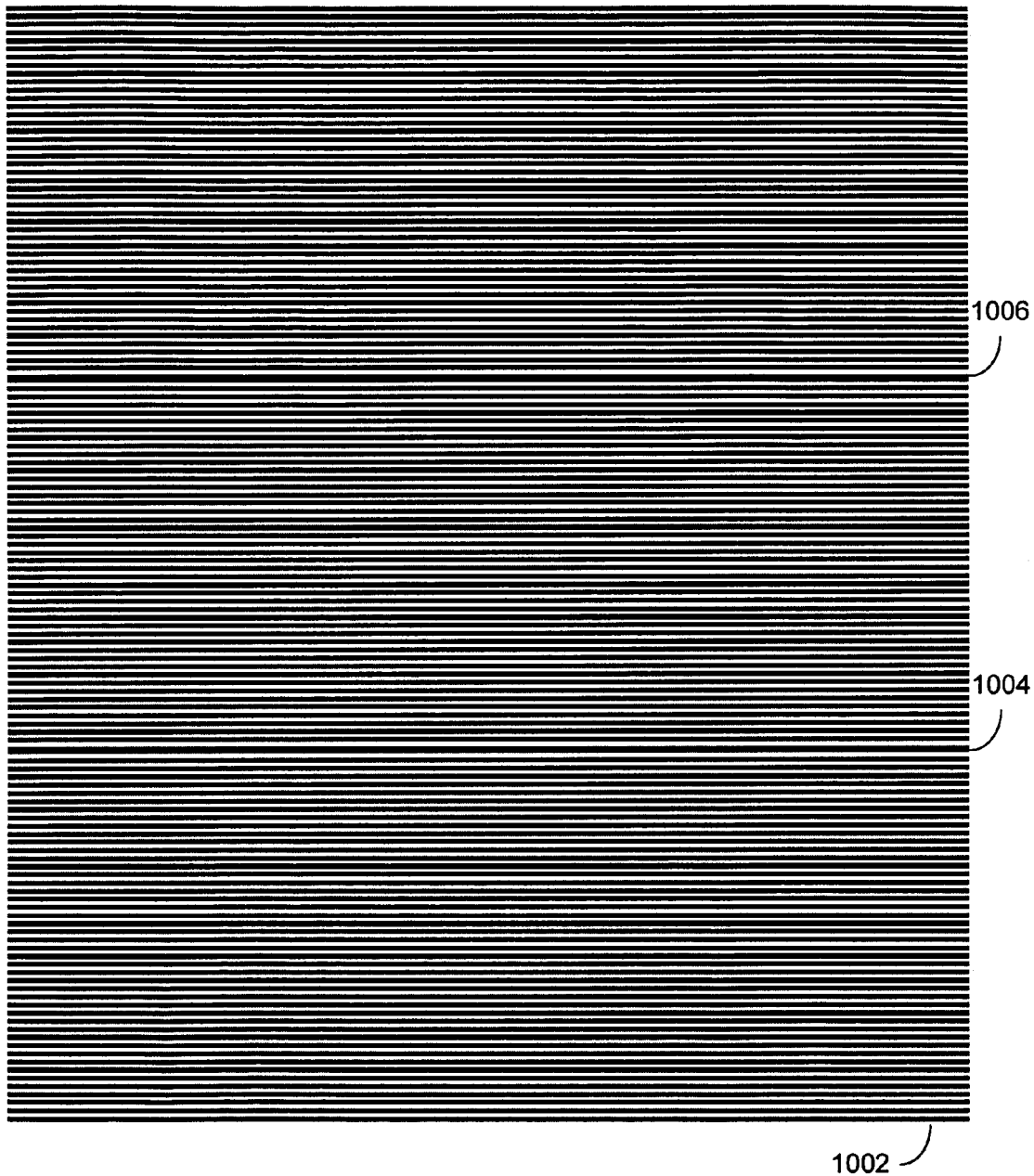
FIG. 10 is an example of a pattern light according to one embodiment of the present invention.

In one embodiment of the present invention, a structured lighting principle is used to capture an image of a pattern that is projected on the target 160 and distorted on the 3D surface of the target. Structured lighting is a front-lighting technique used to extract surface features from 3D targets and to reconstruct the geometry of the target's surface. In structured lighting, a light pattern, such as a set of lines, a grid, or any other pattern, is projected onto a target 160 at a known angle using a light source, such as illumination unit 120. The light pattern intersects with a target and is reflected according to the contours of the target. The 3D image capturing device 140 detects the reflected light and the perturbation of the linear pattern projected and on the target 160. FIG. 10 is an example of a patterned light 1002 in accordance with one embodiment of the present invention. FIG. 3 is an example of a distorted image of a face having patterned light projected thereon 302 in accordance with one embodiment of the present invention. In some embodiments the pattern of the patterned light is irregular, aperiodic and/or has coding embedded in the pattern. One example is the pattern illustrated in FIG. 10 where there are two aperiodic horizontal lines (1004, 1006) embedded in the pattern. With this pattern, the thicker horizontal lines 1004, 1006 can be positioned over known features of the face, e.g., over the mouth and eyes, to assist in locating other facial features. In another embodiment each stripe can be coded, for example, by having a different pattern within various stripes, which can be used as locator marks to assist in locating facial features.

Figure 4:
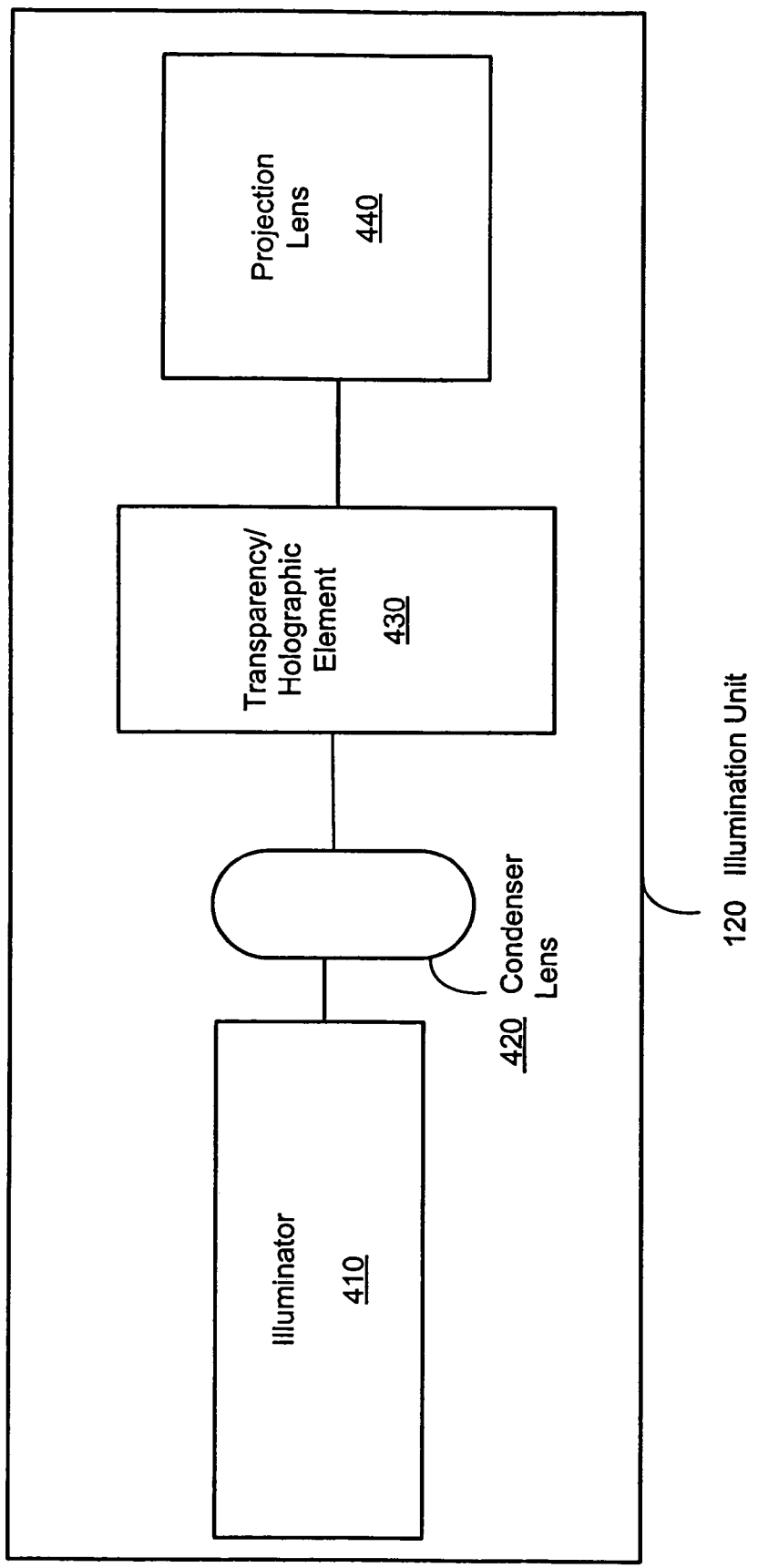
FIG. 4 is a block diagram of the illumination unit according to one embodiment of the present invention.

FIG. 4 is a block diagram of the illumination unit in accordance with one embodiment of the present invention. The illumination unit 120 comprises an illuminator 410, condenser lens 420, a transparency or holographic element 430, and projection lens 440. The illuminator 410 and condenser lens 420 are adapted to optimize lighting projected on the transparency 430. The transparency 430 is a slide pattern that is projected onto the target 160 by illumination unit 120. In one embodiment, the transparency 430 includes aperiodic horizontal stripes as described above with reference to FIG. 10. In this embodiment, the width of the stripes may not be the same, and the distance between any two stripes may not be the same. As described above, projecting the transparency image with aperiodic stripes is advantageous because it increases the accuracy of the process of restoring a 3D image. A person of ordinary skill in the art will understand that the transparency 430 may include periodic horizontal stripes, a grid, or any other pattern. The projection lens 440 is adapted to project the image of the transparency 430 on the target 160 in different spectral ranges of electromagnetic radiation.

With reference to FIGS. 2 and 11, the 3D image capturing device 140 is adapted to capture an image of a pattern that is projected and distorted on the 3D surface of the target 160. The 3D image capturing device 140 can be a grey scale video camera, such as SK-1004XC/SOR3 video camera that is commercially available from Huviron Co. Ltd., Republic of Korea. In one embodiment, the 3D image capturing device 140 also includes a sensor 255, a filter 240, and a controller unit 245. In the embodiment illustrated in FIG. 11, the sensor 255, filter 240 and controller unit 245 are positioned on a printed circuit board 260.

Sensor 255 is adapted to transform an optical signal received from the 3D object 160 to an analog signal or directly to a digital signal. Controller unit 245 is adapted to receive the analog signal from sensor 255 and transform the signal into a composite TV signal. If a digital sensor is used, the digital signal can be sent directly to the processor unit 165 for 3D surface conversion.

Filter 240 is adapted to allow the 3D image capturing device 140 to capture an image in a non-visible range. In one embodiment, device 140 captures an image at the same wavelength that the illumination unit 120 generates. For example, if the illumination unit 120 projects light at the wavelength of 785 nanometers, the 3D image capturing image 140 cuts out substantially all other wavelength. Filter 240 can be a bandpass filter, such as Intor 758/10/75 that is commercially available from Intor, Inc, Socorro, N. Mex.

The enrollment device 110 also includes a controller board 260, speaker unit 280, and a light source 285. The light source 285 is adapted to emit visible light that can be used, for example, to provide feedback to a target 160 regarding whether access to a secured area is granted. The light source 285 can be, for example, a light emitting diod (LED). The speaker unit 280 is adapted to convert an electrical signal into sound. The sound can be used, for example, to communicate with the target 160 regarding whether access to a secured area is granted.

The controller board 260 is adapted to act as an intermediary between the processor unit 165 and peripheral devices, such as the card reader 175, door access control (not shown), and any other peripheral device connected to the enrollment device 110. In addition, the controller board 260 can be adapted to control the speaker unit 280 and the light source 285.

The 2D image capturing device 185 is adapted to capture an image of a 2D view of the target 160. The 2D image capturing device 185 is positioned above the optical unit 200. The output of the 2D image capturing device 185 is a sequence of 2D color images that can be used in passports, driver licenses, and other identification documents, as well as in biometric control. The 2D image capturing device 185 can be any color video or photographic camera adapted to capture 2D color images (e.g., Canon, Minolta, uEye 1540 or Nikon). In an alternate embodiment the 2D image capturing device 185 can capture images in black and white.

The 2D image capturing device 185 also includes a sensor 210, a controller unit 290, and a filter 215. Sensor 210 is adapted to transform an optical signal received from object 160 to an analog camera signal. The Controller unit 290 is adapted to receive the analog signal from sensor 210 and transform the signal into a composite TV signal. If a digital sensor is used the digital signal goes directly to the processor unit for 3-D surface conversion. Filter 215 is adapted to allow the 2D image capturing device 185 to see the target 160 in visible light.

In another embodiment, the 2D image capturing device 185 is part of the 3D image capturing device 140. In this embodiment, the 3D image capturing device 140 is adapted to capture a 3-D surface of target 160 as well as to capture a 2-D image of the frontal view of the target 160 and output 2D color images.

Figure 5:
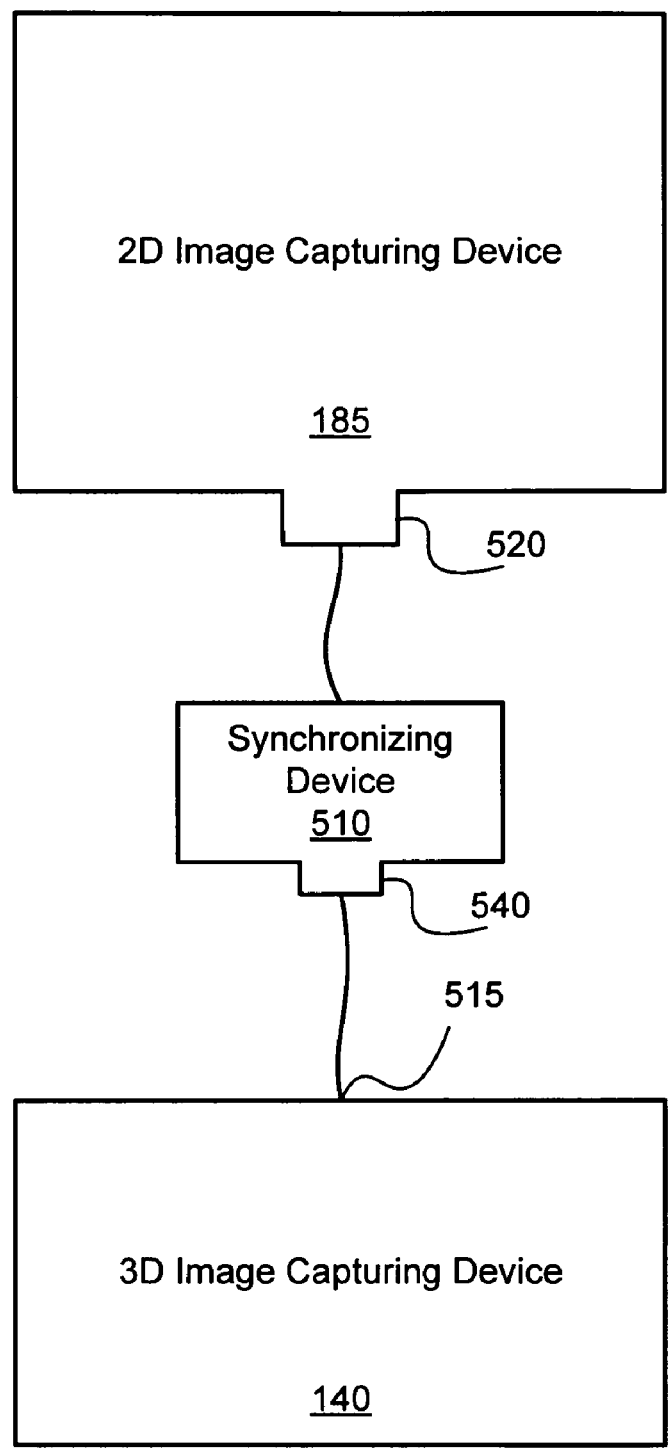
FIG. 5 is a block diagram of 2D image capturing device and 3D image capturing device connected to perform synchronous capture of images according to another embodiment of the present invention.

In another embodiment, 2D image capturing device 185 and 3D surface capturing device 140 are adapted to simultaneously capture at least one 2D image of target 160 and an 3D surface of the target 160. With reference to FIG. 5, a synchronizing signal 510 can be connected to the sync input 520 of the 2D image capturing device 185 and the synch input of device 140 the 3D surface capturing device. This allows device 185 and device 140 to capture images simultaneously.

The orientation unit 170 is adapted to position the target 160, such as a human face, so that the target 160 is in the fields of view 117, 118, and 119 of the 2D image capturing device 185, the illumination unit 120 and the 3D image (surface) capturing device 140, as shown in FIG. 1A. In one embodiment, the orientation unit 170 is positioned in the front of the optical unit 200 between illumination unit 120 and 3D image capturing device 140. The orientation unit 170 is adapted to display the image of the target 160 that is seen by the 3D image capturing device 140. The orientation unit 170 is aligned so that when the image of the target 160 appears in the orientation unit 170, the target 160 is in the field of view of the 3D image capturing device 140, the illumination unit 120, and 2D image capturing device 185. This enables the target 160 to position himself properly based upon the feedback provided by the orientation unit 170. The orientation unit 170 can be a plasma screen, a liquid crystal display (LCD), microdisplay, or any other surface adapted to display the target's face.

In another embodiment, enrollment device 110 can be in compliance with the standards imposed by the International Civil Aviation Organization (ICAO) for creating photographic images, as well with other standards for creating photographic images. The 2D image capturing device 185 can be adapted to meet the ICAO requirements with respect to scene constraints (pose, expression, etc.), photographic properties (lighting, positioning, camera focus, etc.), digital image attributes (image resolution, image size, etc.), as well as a data format. Additional details regarding the ICAO enrollment are found in U.S. patent application Ser. No. 11/254,220 referenced above.

Figure 6:
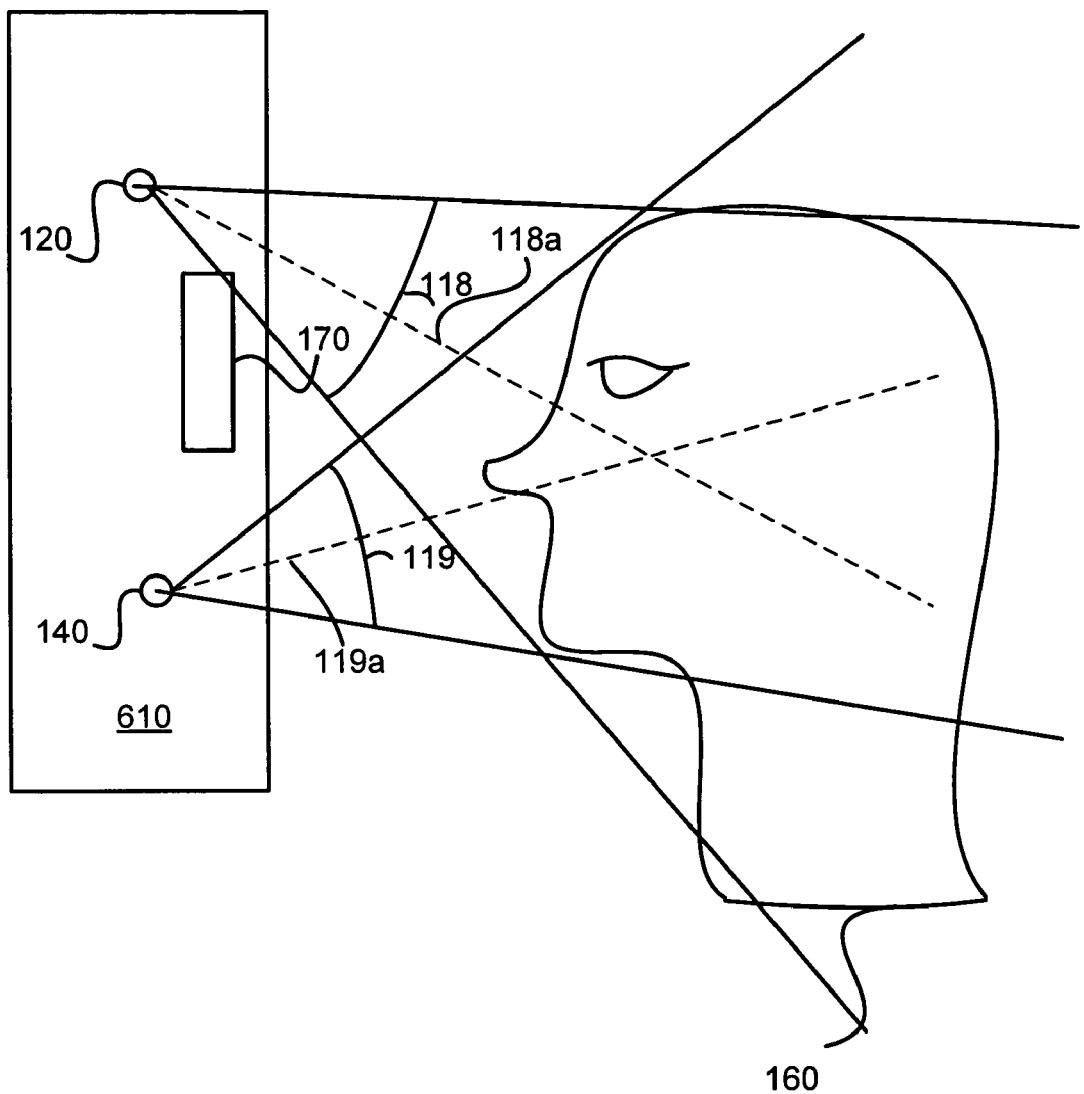
FIG. 6 is a side view of a device that performs access control to secured areas according to one embodiment of the present invention.

Referring now to FIG. 6, a side view of an apparatus for biometric enrollment and control of a face of a human being is shown. Enrollment device 610 can be a stationary device mounted on a wall adapted to control physical access of targets to a secured area. Yet, in another embodiment, enrollment device 610 can perform user biometric enrollment and can also control physical access to a secure area.

In operation, the target 160 positions himself in front of an orientation unit 170 so that the target 160 is in the fields of view 118 and 119 of a 3D image capturing device 140 and illumination unit 120. In this embodiment, enrollment device 610 captures an image of a pattern projected and distorted on the 3D surface of the target 160. Illumination unit 120 projects a patterned light on target 160, for example in an invisible range as described above. The orientation unit 170 can be connected in the front of the optical unit 200 between illumination unit 120 and 3D image capturing device 140. The orientation unit 170 is calibrated to display the image of the target 160 that is seen by the 3D image capturing device 140. This enables the target 160 to position himself properly based upon the feedback provided by the orientation unit 170. Orientation unit 170 can be a plasma screen, a liquid crystal display (LCD), a mirror, microdisplay device, or any other surface adapted to display the target's face.

Figure 8:
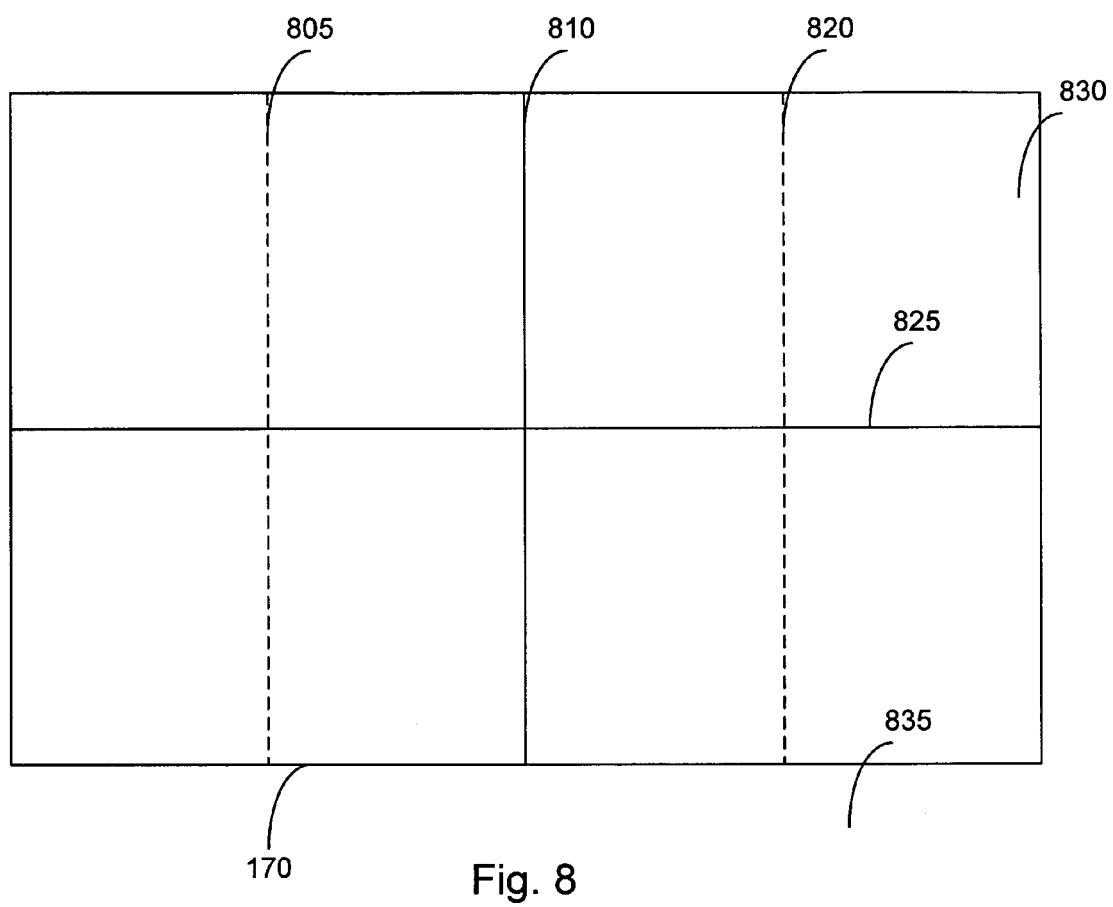
FIG. 8 illustrates one embodiment of the orientation unit according to one embodiment of the present invention.

When the orientation unit 170 is a mirror, the mirror is coupled to the front panel of the enrollment device 610 so that when the target 160 looks at the mirror and sees the reflection of his eyes, then the target 160 is in the field of view 118 of the illumination unit 120 and in the field of view 119 of the 3D image capturing device 140. There are several ways to properly position target 160 in the fields of view of both the illumination unit 120 and the 3D image capturing device 140. For example, with reference to FIG. 8, in one embodiment, the orientation unit 170 has vertical opaque stripes 805, 810, and 820 and a horizontal opaque stripe 825, which intersect at the symmetry center of orientation unit 170. The vertical stripes 805, 810, and 820 rest in the plane of optical axes of the illumination unit 120 and 3D image capturing device 140. When a person looks at the mirror, the person adjusts his position according to the stripes. For example, the upper part of the person's face (the area above the nose) is reflected in the upper portion 830 of the orientation unit 170 and the area of the face below the nose is reflected in the lower portion 835 of the orientation unit 170.

Figure 9:
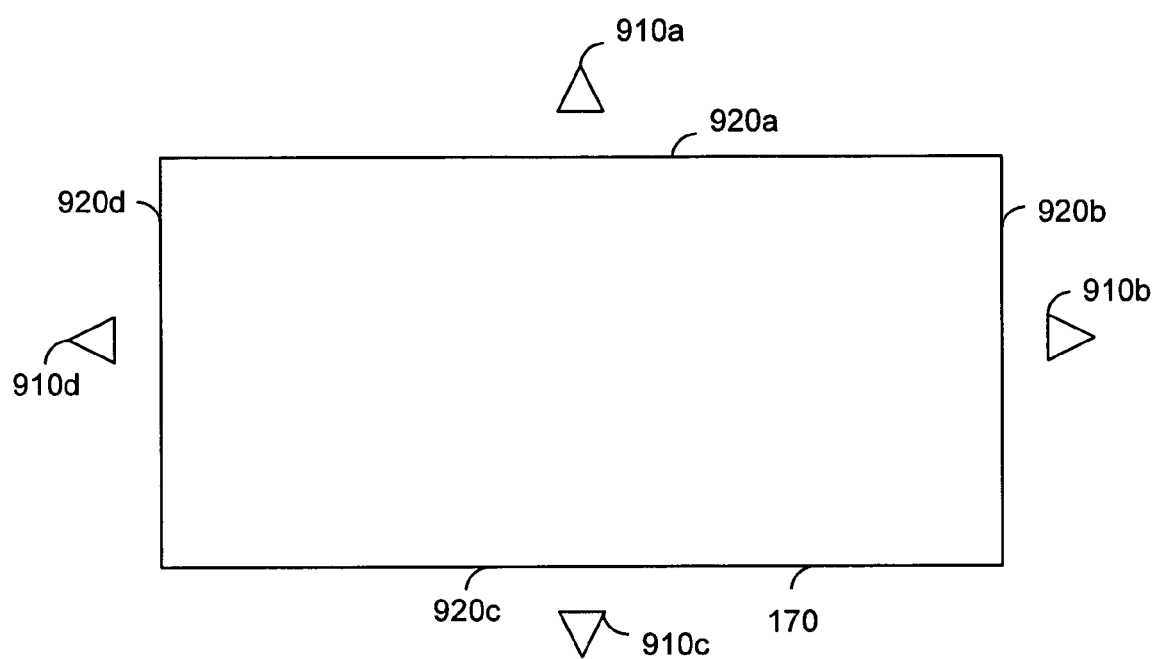
FIG. 9 illustrates one embodiment of the orientation unit according to one embodiment of the present invention.

In another embodiment, the orientation unit 170 may include indicators that help to position the target 160 relative to the optical axes of the illumination unit 120 and 3D image capturing device 140. Referring now to FIG. 9, indicators 910a, 910b, 910c, and 910d are positioned along the upper 920a, right 920b, lower 920c, and left 920d edges of the orientation unit 170 respectively. When the target 160 positions his face in front of the orientation unit 170, the indicators guide the target 160 to choose the best position so that the target 160 is in the field of view of the 3D image capturing device 140 and illumination unit 120.

Figure 7:
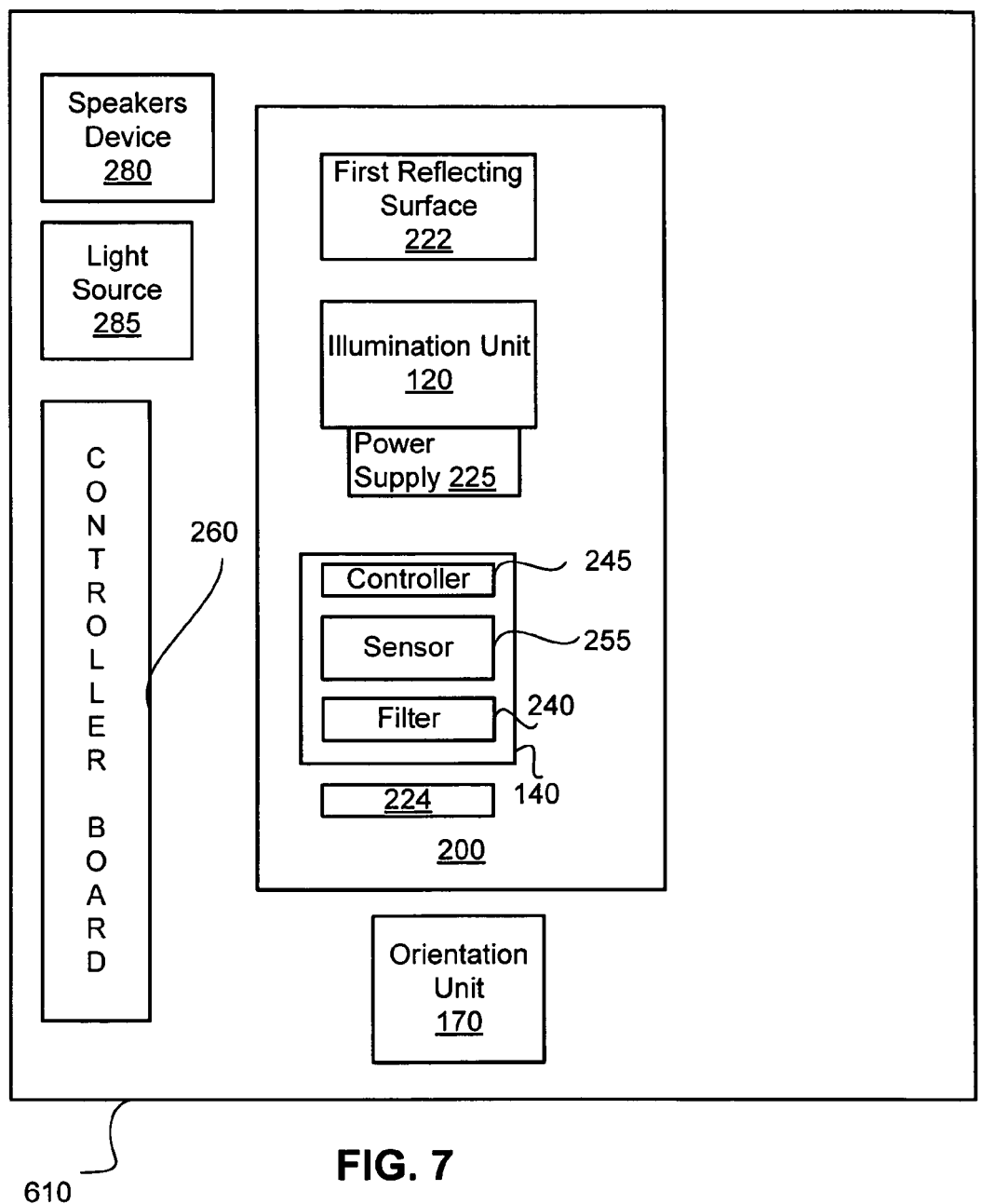
FIG. 7 is a block diagram of the access control device according to one embodiment of the present invention.

FIG. 7 is a block diagram of the components of the enrollment device 610. As shown in FIG. 7, enrollment device 610 includes an optical unit 200, and orientation unit 170, a controller board 260, a speaker unit 280, and a light source 285. The optical unit 200 comprises the illumination unit 120 coupled to a power supply unit 225, the 3D image capturing device 140, a first reflecting surface 222, and a second reflecting surface 224. These components were discussed above.

The present invention has been described in particular detail with respect several embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

What is claimed is:

1. A system for enrolling a three dimensional image of a target face comprising:
   an illumination unit for generating a patterned light signal having a first pattern including at least one location identifier, said patterned light signal projected in a first projection cone, wherein said first pattern is distorted onto the target face to form a distorted first pattern when said target face is positioned within said first projection cone;
   a 3D image capturing device for receiving an image of said distorted first pattern when the target face is positioned within a 3D camera cone; and
   an orientation unit having visible orientation markings for generating an image of the target face when the target face is positioned within the first projection cone and the 3D camera cone;
   each of said at least one location identifier of said first pattern having a pre-defined position with respect to said visible orientation markings of said orientation unit such that when said target face is oriented with respect to said visible orientation markings, pre-selected features of said target face are at or proximate said at least one location identifier.

2. The system of claim 1 wherein said patterned light has a wavelength outside of a visible light range.

3. The system of claim 2, further comprising:
   a 2D image capturing device for receiving a two dimensional image of the target face when the target face is positioned within a 2D camera cone.

4. The system of claim 3, further comprising:
   a synchronous controller, coupled to said 3D image capturing device and said 2D image capturing device to enable substantially simultaneously receiving said image of said distorted first pattern by the 3D image capturing device and said two dimensional image by the 2D image capturing device.

5. The system of claim 1, further comprising:
   a biometric unit, coupled to said 3D image capturing device, to identify biometric information about the target face based upon the distorted first image.

6. A method for enrolling a three dimensional image of a target face comprising:
   generating, with an illumination unit, a patterned light signal having a first pattern including at least one location identifier, said patterned light signal projected in a first projection cone, wherein said first pattern is distorted onto the target face to form a distorted first pattern when said target face is positioned within said first projection cone;
   receiving, with a 3D image capturing device, an image of said distorted first pattern when the target face is positioned within a 3D camera cone;
   providing, with an orientation unit, visible orientation markings; and
   generating, with said orientation unit, an image of the target face when the target face is positioned within the first projection cone and the 3D camera cone
   each of said at least one location identifier of said first pattern having a pre-defined position with respect to said visible orientation markings such that when said target face is oriented with respect to said visible orientation markings, pre-selected features of said target face are at or proximate said at least one location identifier.

7. The method of claim 6 wherein said patterned light has a wavelength outside of a visible light range.

8. The method of claim 7, further comprising the step of:
   receiving a two dimensional image of the target face when the target face is positioned within a 2D camera cone.

9. The method of claim 8, further comprising the step of:
   substantially simultaneously receiving said image of said distorted first pattern by the 3D image capturing device and said two dimensional image by the 2D image capturing device.

10. The method of claim 6, further comprising the step of:
    identifying biometric information about the target face based upon the distorted first image.

11. The system of claim 2 wherein said first pattern comprises a series of horizontal lines.

12. The system of claim 11 wherein said at least one location identifier comprises at least one horizontal line dimensionally different from all remaining horizontal lines of said series.

13. The system of claim 11 wherein said at least one location identifier comprises two horizontal lines dimensionally different from all remaining horizontal lines of said series, said two horizontal lines spaced by other horizontal lines of said series.

14. The system of claim 13 wherein said two horizontal lines are thicker than from all remaining horizontal lines of said series.

15. The system of claim 13 wherein said orientation unit comprises a mirror.

16. The system of claim 13 wherein said orientation unit comprises an electronic display.

17. The method of claim 7 wherein said first pattern comprises a series of horizontal lines.

18. The method of claim 17 wherein said at least one location identifier comprises at least one horizontal line dimensionally different from all remaining horizontal lines of said series.

19. The method of claim 17 wherein said at least one location identifier comprises two horizontal lines dimensionally different from all remaining horizontal lines of said series, said two horizontal lines spaced by other horizontal lines of said series.

20. The method of claim 19 wherein said two horizontal lines are thicker than from all remaining horizontal lines of said series.

* * * * *